US011987001B2

(12) United States Patent
Gjovik et al.

(10) Patent No.: US 11,987,001 B2
(45) Date of Patent: May 21, 2024

(54) MACHINE FOR PRODUCING AN ADDITIVE PRINTED PART

(71) Applicant: Nexa3D Inc., Ventura, CA (US)

(72) Inventors: Erik John Gjovik, Aliso Viejo, CA (US); Jason Greene, Huntington Beach, CA (US); William Jack MacNeish, III, Newport Beach, CA (US)

(73) Assignee: Nexa3D Inc., Ventura, CA (US)

( * ) Notice: Subject to any disclaimer, the term of this patent is extended or adjusted under 35 U.S.C. 154(b) by 452 days.

(21) Appl. No.: 17/401,004

(22) Filed: Aug. 12, 2021

(65) Prior Publication Data

US 2021/0370600 A1 Dec. 2, 2021

Related U.S. Application Data

(63) Continuation-in-part of application No. PCT/US2020/016982, filed on Feb. 6, 2020, which is
(Continued)

(51) Int. Cl.
*B29C 64/295* (2017.01)
*B29C 64/209* (2017.01)
(Continued)

(52) U.S. Cl.
CPC .......... *B29C 64/295* (2017.08); *B29C 64/209* (2017.08); *B29C 64/25* (2017.08); *B33Y 30/00* (2014.12)

(58) Field of Classification Search
CPC ..... B29C 64/209; B29C 64/295; B29C 64/25; B33Y 30/00
See application file for complete search history.

(56) References Cited

U.S. PATENT DOCUMENTS 8,647,102 B2 2/2014 Swanson et al.
2004/0104515 A1 6/2004 Swanson et al.
(Continued)

FOREIGN PATENT DOCUMENTS

CN 1356936 A 7/2002
CN 106041080 A 10/2016
(Continued)

OTHER PUBLICATIONS

International Searching Authority. International Search Report and Written Opinion for PCT/US2020/016982, dated Apr. 7, 2020, pp. 1-8.
(Continued)

*Primary Examiner* — Nahida Sultana
(74) *Attorney, Agent, or Firm* — Ascenda Law Group, PC

(57) ABSTRACT

A machine for producing additive printed parts having a print head attached to a gantry, including a frame having a plurality of side walls that define an interior space, a build table positioned within the interior space and including a print bed for supporting the additive printed part, a plurality of bellows attached at a first end to the gantry and at a second end to at least one of the plurality of side walls, a build volume defined by the plurality of side walls, the plurality of bellows and the build table, and an infrared heater disposed on the build table for heating an additive printed part positioned on the build table.

24 Claims, 6 Drawing Sheets

Related U.S. Application Data a continuation of application No. 16/273,812, filed on Feb. 12, 2019, now Pat. No. 10,836,106.

(51) Int. Cl.
  *B29C 64/25* (2017.01)
  *B33Y 30/00* (2015.01)

(56) References Cited

U.S. PATENT DOCUMENTS

| | | | |
|---|---|---|---|
| 2009/0297715 A1* | 12/2009 | Luetke | G03F 7/34 427/256 |
| 2012/0164256 A1 | 6/2012 | Swanson et al. | |
| 2015/0140158 A1 | 5/2015 | Cervantes et al. | |
| 2015/0273582 A1 | 10/2015 | Crump et al. | |
| 2015/0341988 A1* | 11/2015 | Messmer | H05B 3/145 392/422 |
| 2016/0236409 A1 | 8/2016 | Armani et al. | |
| 2016/0318248 A1 | 11/2016 | Susnjara et al. | |
| 2017/0021565 A1 | 1/2017 | Deaville | |
| 2017/0151704 A1 | 6/2017 | Go et al. | |
| 2018/0326660 A1 | 11/2018 | Gifford et al. | |
| 2019/0375156 A1 | 12/2019 | Knox | |

FOREIGN PATENT DOCUMENTS

| | | |
|---|---|---|
| CN | 108248043 A | 7/2018 |
| CN | 207889132 U | 9/2018 |
| CN | 109070448 A | 12/2018 |
| EP | 1204517 B1 | 4/2009 |

OTHER PUBLICATIONS

The State Intellectual Property Office of People's Republic of China. First Office Action for CN Application No. 2020800135750 and English translation, dated Aug. 26, 20222, pp. 1-13.

* cited by examiner

MACHINE FOR PRODUCING AN ADDITIVE PRINTED PART

CROSS-REFERENCE TO RELATED APPLICATIONS

This application is a bypass continuation-in-part of International Application No. PCT/US2020/016982, filed on Feb. 6, 2020, which claims priority to U.S. Serial application Ser. No. 16/273,812, filed on Feb. 12, 2019 (now issued as U.S. Pat. No. 10,836,106), the content of all of which is incorporated herein by reference.

INTRODUCTION

The present disclosure relates to a machine for producing additive printed parts, and more particularly to a high-speed extrusion machine having features that heat an additive printed during and after the part is being created.

Conventional heating of additive printed parts during and after their creation, such as with a convection heating device would serve the purpose of maintaining the temperature of the additive printed part. However, the disadvantage of using such heating methods is that the entire ambient space within which the additive printed part is created must be heated as well. This is wasteful from and energy standpoint and makes loading and unloading parts from the machine difficult due to the high temperature of the ambient air within the machine and the high temperature of the surfaces within the machine. Additionally, the high ambient temperatures within the machine can be detrimental to sensitive components within the machine.

Thus, while current heating devices achieve their intended purpose, there is a need for a new and improved system that will allow the temperature of an additive printed part to be maintained without wasting heat energy.

SUMMARY

According to several aspects of the present disclosure, a machine for producing an additive printed part having a print head that is attached to a gantry. The machine has a frame having a plurality of side walls that define an interior space, a build table that is positioned within the interior space and includes a print bed to support the additive printed part, a plurality of bellows that are attached at a first end to the gantry and at a second end to at least one of the plurality of side wads, at least one window attached to at least one of the sidewalls, a build volume that is defined by the plurality of side walls, the plurality of bellows, the build table, and the at least one window, and a first infrared heater disposed on the build table for heating an additive printed part positioned on the build table. Each of the side walls, the bellows, and the window includes a reflective surface oriented inward to the interior space. The machine further includes one or more sensors positioned within the build volume for measuring IR heat reflected by the part.

In an additional aspect of the present disclosure, the reflective surface of the side walls and the bellows is at least one of polished aluminum, polished steel, and an IR reflective coating.

In an additional aspect of the present disclosure, the build table within the build volume is polished aluminum, and the reflective surface of the at least one window is an IR reflective coating.

In an additional aspect of the present disclosure, the first infrared heater produces infrared energy having a wavelength ranging from 2 to 12 microns.

In an additional aspect of the present disclosure, the first infrared heater is mounted to the build table and oriented to emit infrared energy onto the additive printed part.

In an additional aspect of the present disclosure, the machine further includes a second infrared heater and a third infrared heater mounted to the build table, the first infrared heater emitting infrared energy onto the additive printed part from a first direction, the second infrared heater emitting infrared energy onto the additive printed part from second direction, and the third infrared heater emitting infrared energy onto the additive printed part from a third direction.

In an additional aspect of the present disclosure, the first, second and third infrared heaters are positioned in proximity to the print bed such that the first infrared heater is positioned a first distance from a center point of the print bed, the second infrared heater is positioned a second distance from the center point of the print bed, and the third infrared heater is positioned a third distance from the center point of the print bed.

In an additional aspect of the present disclosure, each of the first, second, and third infrared heaters are elongated and cylindrical in shape, wherein infrared energy is emitted from each infrared heater in all directions extending 360 degrees around the cylindrical infrared heater.

In an additional aspect of the present disclosure, the build table is rectangular in shape, the first infrared heater being mounted horizontally, adjacent and parallel to a first side of the build table, the second infrared heater being mounted horizontally, adjacent and parallel to a second side of the build table, and the third infrared heater being mounted horizontally, adjacent and parallel to a third side of the build table.

In an additional aspect of the present disclosure, each infrared heater further includes a reflective shroud adapted to focus the infrared energy from the infrared heater toward the additive printed part.

In an additional aspect of the present disclosure, each reflective shroud has an elongated channel shape extending substantially the entire length of the infrared heater and has an inner reflective surface and an outer surface, each shroud being oriented such that infrared energy emitted directly toward the additive printed part is not reflected and energy emitted away from the additive printed part is reflected by the inner reflective surface of the reflective shroud back toward the additive printed part.

In an additional aspect of the present disclosure, the inner surface of the reflective shroud is made from polished aluminum.

In an additional aspect of the present disclosure, a black body radiation sensor is mounted within the build volume for monitoring the temperature of the additive printed part.

In an additional aspect of the present disclosure, a plurality of black body sensors are mounted at various locations within the build volume for monitoring the temperature of the additive printed part.

According to several aspects of the present disclosure, a machine is provided for producing an additive printed part, with the machine having a print head attached to a gantry. The machine includes a frame having a plurality of side walls, with the plurality of side walls defining an interior space. The machine further includes a build table positioned within the interior space and including a print bed. The additive printed part being positioned at a center point on the print bed as the additive printed part is created. The machine further includes a plurality of bellows attached at a first end to the gantry and at a second end to at least one of the plurality of side walls. The machine further includes one or more windows attached to at least one of the sidewalls, with each of the side walls, the bellows, and the at least one window includes a reflective surface oriented inward to the interior space. The machine further includes a build volume defined by the reflective surface of the side walls, the reflective surface of the bellows, the reflective surface of the build table, and the reflective surface of the at least one window. The machine further includes a first infrared heater mounted horizontally, adjacent and parallel to a first side of the build table at a first distance from the center point of the print bed and oriented to emit infrared energy toward the center point of the print bed from a first direction. The machine further includes a second infrared heater mounted horizontally, adjacent and parallel to a second side of the build table at a second distance from the center point of the print bed and oriented to emit infrared energy toward the center point of the print bed from a second direction. The machine further includes a third infrared heater mounted horizontally, adjacent and parallel to a third side of the build table at a third distance from the center point of the print bed and oriented to emit infrared energy toward the center point of the print bed from a third direction. At least one of the first infrared heater, the second infrared heater, and the third infrared heater comprises a multiplexed infrared light source. The machine further includes one or more one sensors positioned within the build volume for measuring IR heat reflected by the additive printed part.

In an additional aspect of the present disclosure, the first infrared heater produces infrared energy having a wavelength ranging from 2 to 12 microns.

In an additional aspect of the present disclosure, each of the first, second, and third infrared heaters are elongated and cylindrical in shape, with each infrared heater emitting infrared energy in all directions extending 360 degrees around the cylindrical infrared heater.

In an additional aspect of the present disclosure, each infrared heater further includes a reflective shroud adapted to focus the infrared energy from the infrared heater toward the additive printed part.

In an additional aspect of the present disclosure, each reflective shroud has an elongated channel shape extending substantially the entire length of the infrared heater and having an inner reflective surface and an outer surface. Each shroud is oriented such that infrared energy emitted directly toward the additive printed part is not deflected and energy emitted away from the additive printed part is reflected by the inner reflective surface of the reflective shroud back toward the additive printed part.

In an additional aspect of the present disclosure, the inner surface of the reflective shroud is made from polished aluminum. The reflective surface of at least one of the sidewalls, the bellows, and the build table is polished aluminum, polished stainless steel, or an IR reflective coating. The reflective surface of the window is an IR reflective window coating.

In an additional aspect of the present disclosure, the machine further includes a black body sensor mounted within the build volume for monitoring the temperature of the additive printed part.

In an additional aspect of the present disclosure, the machine further includes one or more convective temperature sensors to monitor the temperature of the ambient air within the build volume.

In an additional aspect of the present disclosure, the machine further includes a plurality of black body sensors mounted at various locations within the build volume for monitoring the temperature of the additive printed part.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
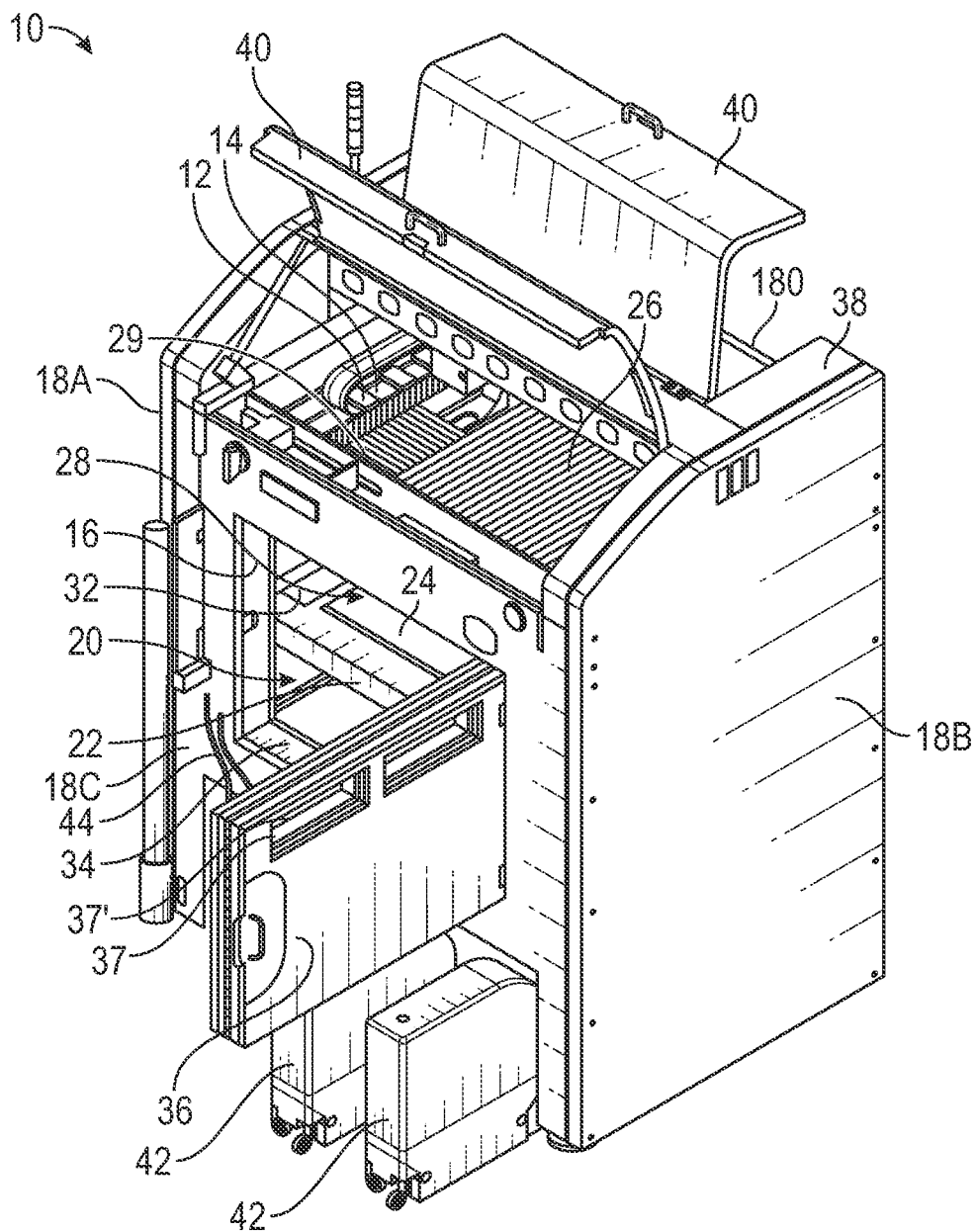
FIG. 1 is an outer perspective view of an additive manufacturing machine according to an exemplary embodiment.

Referring to FIG. 1, a machine for producing an additive printed part is generally shown at 10. The machine 10 includes a print head 12 that is attached to a gantry 14, and a frame 16 which supports side walls 18 that define an interior space 20 of the machine 10. A build table 22 is positioned within the interior space 20 and includes a print bed 24, Bellows 26A. 26B are attached at one end to the gantry 14 and at the opposite end to one of the side walls 18. The side walls 18, the bellows 26, 27 and the build table 22 define a build volume 28 within which an additive printed part 30 will be created. An infrared heater 32 is mounted within the build volume 28. The infrared heater 32 is used to heat the additive printed part 30 during and after the creation of the additive printed part 30.

The machine 10 includes a first side wall 18A, a second side wall 18B, a front side wall 18C, a rear side wall 18D, and a top 38. The front side wall 18C includes an opening 34 and a door 36 to allow access to the interior space 20. The machine 10 further includes one or more windows 37 attached to the door. In this example, the machine 10 includes two windows 37 integrated within the door 36. The top 38 includes two hinged doors 40 to allow access to upper portions of the machine 10 and the print head 12. The first side wall 18A, 18B, 18C, 18D and the top 38 provide an enclosure for the machine 10 and define the interior space 20 of the machine 10. The interior space 20 of the machine 10 provides a controllable environment for the creation of the additive printed part 30. During and after creation of the additive printed part 30, preventing contamination and controlling the temperature of the additive printed part 30 is critical. It is contemplated that other examples of the machine can include any number of windows integrated within any one or more of the first side wall 18A, the second side wall 18B, the front side wall 18C, the rear side wall 18D, and/or the top 38.

The print head 12 is adapted to feed and deposit a polymer filament 44 to create an additive printed part 30. In the present example, the machine 10 includes cartridges 42 that house a coil of the polymer filament 44. The polymer filament 44 is fed to the print head 12 and the print head 12 is configured to deposit the polymer material, first onto the print bed 24, and then onto the layers of polymer material already deposited on the print bed 24. Successive layers of the polymer material are deposited until the final shape of the additive printed part 30 is formed.

Figure 2:
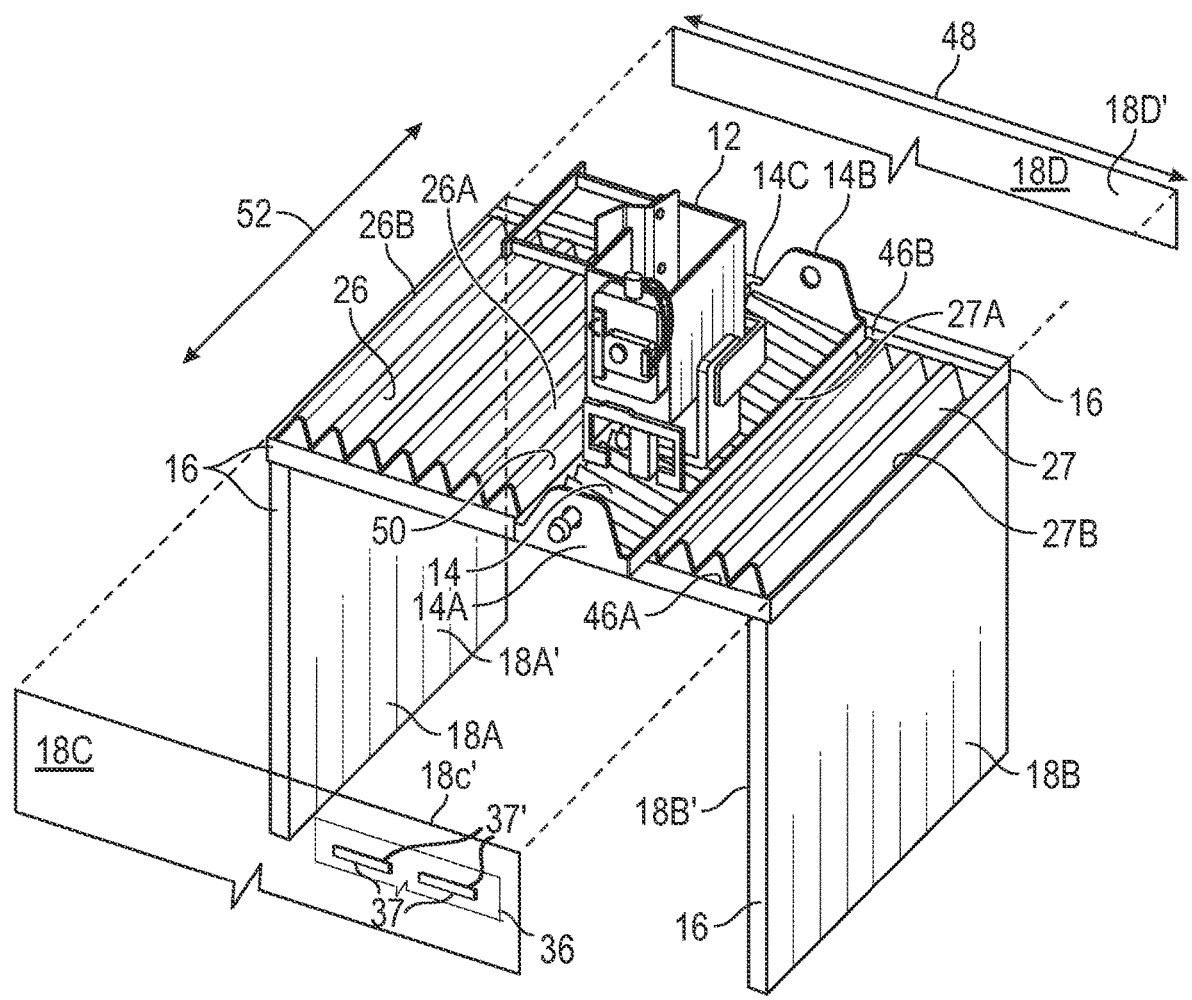
FIG. 2 is a partially exploded view of upper portions of the machine.

Referring to FIG. 2, the print head 12 is attached to a gantry 14. The gantry 14 is supported by the frame 16 within the interior space 20 of the machine 10 and is mounted on a pair of gantry rails 46A, 46B. A first gantry side rail 46A is mounted horizontally to the frame 16 adjacent and parallel to the front side wall 18C. A second gantry side rail 46B is mounted horizontally to the frame 16 adjacent and parallel to the rear side wall 18D. A first end 14A of the gantry 14 is movably supported by the first gantry rail 46A and a second end 14B of the gantry 14 is movably supported by the second gantry rail 468. The gantry is moveable back and forth linearly along the gantry rails 46A, 46B within the interior space 20 of the machine 10 along an x-axis 48.

The gantry 14 includes a print head rail 50 which movably supports the print head 12 on the gantry 14. The print head 12 moves back and forth linearly on the print head rail 50 along a y-axis 52 that is co-planer and perpendicular to the x-axis 48. Movement of the gantry 14 along the x-axis 48 and movement of the print head 12 along the y-axis 52 allows the print head 12 to move two-dimensionally along a horizontal plane within the interior space of the machine 10.

First, second, third and fourth bellows 26, 27, 29, 31 are positioned around the print head 12. Each bellow 26, 27, 29, 31 has a first end 26A, 27A, 29A, 31A that is attached either to the gantry 14 or to the print head 12, and a second end 26B, 273, 293, 313 that is attached to one of the side walls 18A, 18B, 18C, 18D. The first ends 26A, 27A of the first and second bellows 26, 27 are attached to the gantry 14, and the first ends 29A, 31A of the third and fourth bellows are attached to the print head. Referring again to FIG. 2, the first bellow 26 has a first end 26A that is attached to a first side 14C of the gantry 14 and a second end 263 that is attached to the first side wall 18A, The second bellow 27 has a first end 27A that is attached to a second side 14D of the gantry 14, opposite the first side 14C of the gantry 14, and a second end 273 that is attached to the second side wall 18B, The third bellow 29 has a first end 29A that is attached to a first side 12A of the print head 12 and a second end 293 that is attached to the first end 14A of the gantry 14. The fourth bellow 31 has a first end 31A that is attached to a second side 123 of the print head 12, opposite the first side 12A of the print head 12, and a second end 31B that is attached to the second end 14B of the gantry 14.

The bellows 26, 27 are flexible to allow the gantry 14 to move back and forth along the x-axis 48. More specifically, when the gantry 14 moves toward the first sidewall 18A, the first bellow 26 is compressible between the gantry 14 and the first sidewall 18A and the second bellow 27 is expandable between the gantry 14 and second sidewall 18B. Alternatively, when the gantry 14 moves in the opposite direction, toward the second side wall 188, the first bellow 26 is expandable between the gantry 14 and the first sidewall 18A and the second bellow 27 is compressible between the gantry 14 and the second sidewall 18B.

The bellows 29, 31 are flexible to allow the print head 12 to move back and forth on the gantry 14 along the y-axis 52. More specifically, when the print head 12 moves toward the first end 14A of the gantry 14, the third bellow 29 is compressible between the print head 12 and the first end 14A of the gantry 14, and the fourth bellow 31 is expandable between the print head 12 and the second end 148 of the gantry 14. Alternatively, when the print head 12 moves in the opposite direction, toward the second end 14B of the gantry 14, the third bellow 29 is expandable between the print head 12 and the first end 14A of the gantry 14 and the fourth bellow 31 is compressible between the print head 12 and the second end 14B of the gantry 14.

Figure 3:
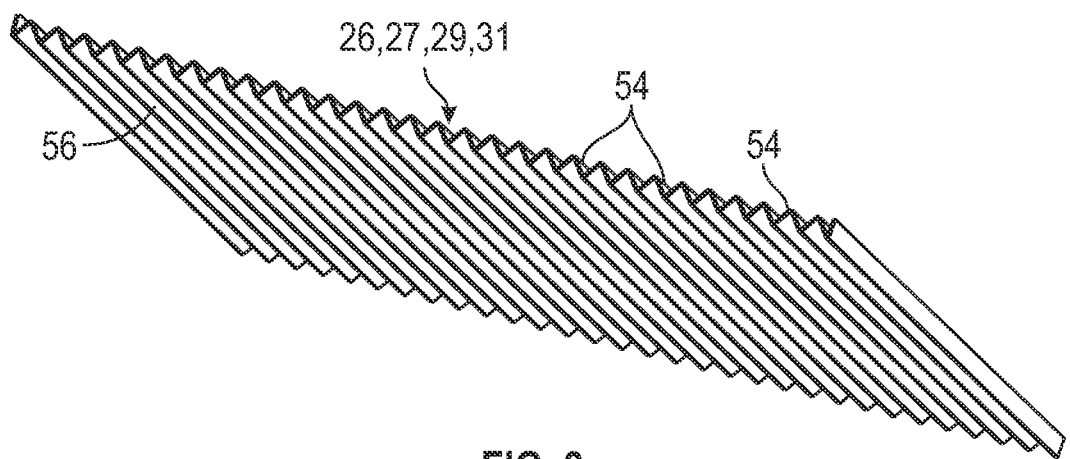
FIG. 3 is a perspective view of a bellow of the machine.
Figure 3A:
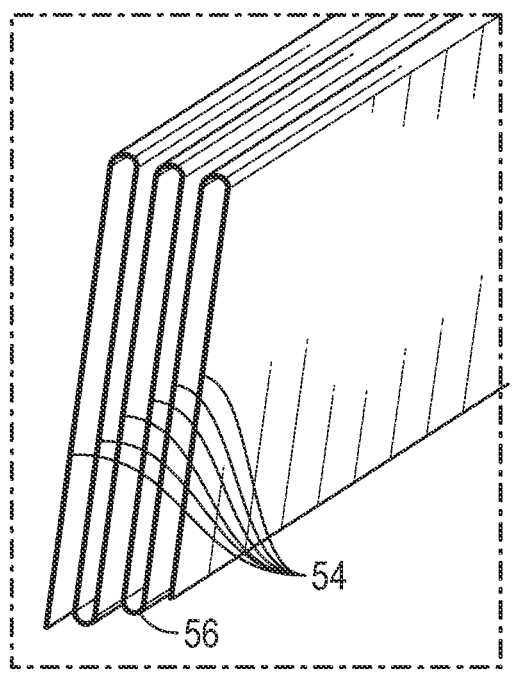
FIG. 3A is a perspective view of a portion of the bellow shown in FIG. 3 where the bellow is compressed.
Figure 3B:
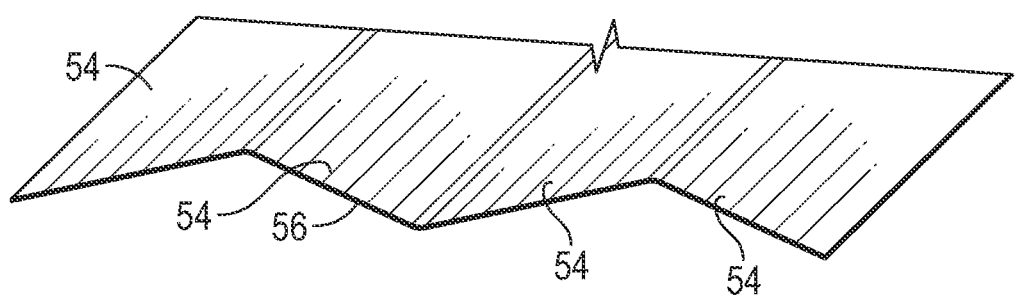
FIG. 3B is a perspective view of the bellow shown in FIG. 3 where the bellow is expanded.

Referring to FIGS. 3, 3A and 38, the bellows 26, 27, 29, 31 include a plurality of rigid segments 54 that are flexibly connected to one another at opposing ends. This accordion structure allows the bellows 26, 27, 29, 31 to compress and expand between a situation where the plurality of rigid segments 54 are in close proximity and compressed against one another, as shown in FIG. 3A, and a situation where the plurality of rigid segments 54 are extended out and are nearly linearly aligned with one another as shown in FIG. 3B.

A downwardly facing surface 56 of the bellows 26, 27, 29, 31 along with inwardly facing surfaces 18A', 18B', 18C', 18D' of the first, second, front and rear side panels 18A, 183, 18C, 18D and a top surface 22A of the build table 22 define the build volume 28. The build volume 28 is the space within which the additive printed part 30 will be created. The build table is movable vertically within the interior space such that the size of the build volume 28 is variable and will expand as the additive printed part 30 is created.

Figure 4:
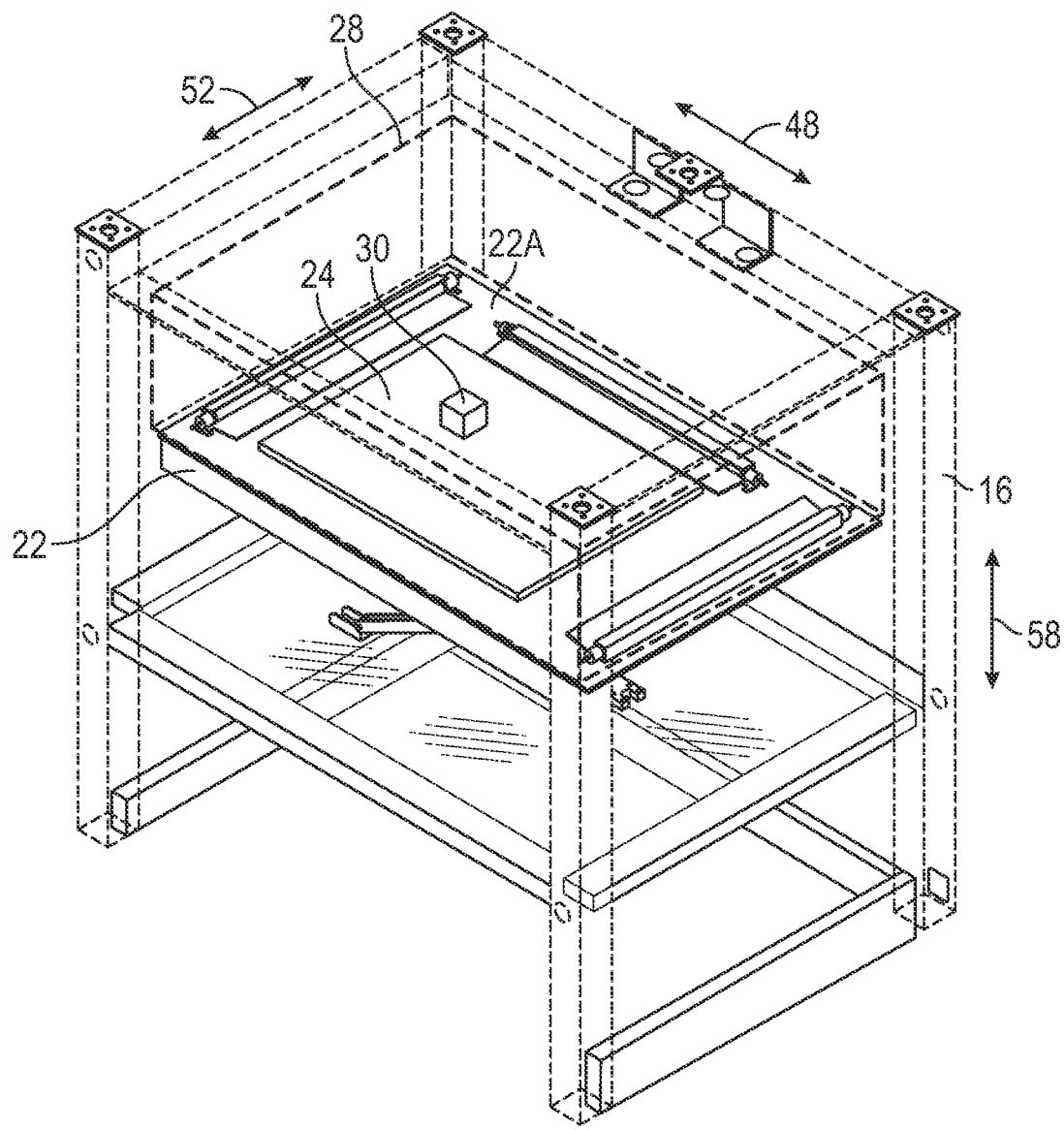
FIG. 4 is a perspective view of a frame and build table of the machine.

Referring to FIG. 4, the frame 16 of the machine 10 is shown with the side panels 18A, 183, 18C, 18D, the top 38, the gantry 14 and the print head 12 removed. A print bed 24 is mounted onto the top surface 22A of the build table 22. The print bed 24 provides a surface on which the additive printed part 30 will be created. The build table 22 is movable linearly and vertically up and down within the interior space 20 along a z-axis 58 that is perpendicular to both the x-axis 48 and y-axis 52. The movement of the print head 12 two-dimensionally along the x-axis 48 and the y-axis 52 along with the movement of the build table 22 along the z-axis 58 allows the print head 12 to produce three-dimensional additive printed parts 30 on the print bed 24.

The infrared heater 32 is used to heat the additive printed part 30 during and after the additive printed part 30 is created. To allow efficient heating of the additive printed part 30, the downwardly facing surface 56 of the bellows 26, 27 along with the inwardly facing surfaces 18A', 18B', 18C', 18D' of the first, second, front and rear side panels 18A, 18B, 18C, 18D and the top surface 22A of the build table 22 are highly reflective. It is important that all surfaces exposed to the build volume 28 are highly reflective to ensure that infrared energy emitted from the infrared heater 32 is reflected and kept within the build volume 28. The use of the infrared heater 32 within the build volume 28 necessitates the use of specific materials.

As shown, the downwardly facing surface 56 of the bellows 26, 27, 29, 31 along with the inwardly facing surfaces 18A', 18B', 18C', 18D' of the first, second, front and rear side panels 18A, 18B, 18C, 18D and the top surface 22A of the build table 22 are polished aluminum. As mentioned above, it would be beneficial for any part of the structure of the machine 10 that is exposed to the build volume 28 to be made from polished aluminum. In other examples, the downwardly facing surface 56 of the bellows 26, 27, 29, 31 along with the inwardly facing surfaces 18A', 18B', 18C', 18D' of the first, second, front and rear side panels 18A, 18B, 18C, 18D and the top surface 22A of the build table 22 can be polished steel or have an IR reflective coating. Continuing with the present example, the windows 37 have an associated one of inwardly facing window surfaces 37' that have a transparent IR reflective window coating to provide a line of sight to the printed part while ensuring that infrared energy emitted from the infrared heater 32 is reflected and kept within the build volume 28

When the process begins, the build table 22 is positioned high within the interior space 20, very close to the print head 12. As material is deposited by the print head 12 onto the print bed 24, the gantry 14 moves back and forth on the first and second gantry rails 46A, 46B along the x-axis 48 and the print head 12 moves back and forth on the first and second print head rails 50A, 50B along the y-axis 52 to create a two-dimensional shape. The build table 22 moves along the z-axis 58, downward away from the print head 12, allowing material to be added to the additive printed part 30 along the z-axis 58 and creating a three-dimensional shape.

As the additive printed part 30 is created, it is important to maintain a temperature of the additive printed part 30 throughout the creation of the additive printed part 30 and to provide heat treatment after the part 30 is created. As the polymer filament 44 is fed through the print head 12 the material of the polymer filament is heated to a predefined temperature. As the additive printed part is created, the temperature of the part itself must be controlled to ensure proper material characteristics of the printed part 30. Controlling the cooling of the printed part 30 as material is being deposited defines many elements of the printed part 30, such as warping, crystallization levels of the solid polymer, residual internal stresses (related to warping), and many others. In some cases, it is important to hold a target temperature throughout the entire process. In other cases it is important to follow a pre-determined temperature-time profile throughout the process or to follow a temperature-time profile after creation of the printed part 30. Generally, parts will be created following a combination of these.

Conventional heating of the additive printed part 30, such as with a convection heating device would serve the purpose of maintaining the temperature of the additive printed part 30. The disadvantage of using such heating methods is that the entire build volume 28 and possibly the entire interior space 20 of the machine 10 are heated as well. This is wasteful from an energy standpoint and makes loading and unloading parts from the machine 10 difficult due to the high temperature of the ambient air within the machine 10. Additionally, the high ambient temperatures within the machine 10 can be detrimental to sensitive components within the machine 10. In an embodiment of the present invention, the machine 10 includes resistive elements mounted on the print bed 24 to provide conductive heating to the print bed 24 and maintain a pre-determined temperature of the print bed 24. Air flow across the print bed 24 provides convective heating of the ambient space within the build volume 28 to maintain a pre-determined temperature of the build volume 28. Additionally, the present invention contemplates other heating elements being mounted within the build volume 28 to provide convective heating of the ambient space within the build volume 28. The infrared heater 32 of the present invention allows the temperature of the additive printed part 30 to be controlled independently of and at temperatures that differ from the temperature of the print bed 24 and the temperature of the ambient space within the build volume 28.

Figure 5:
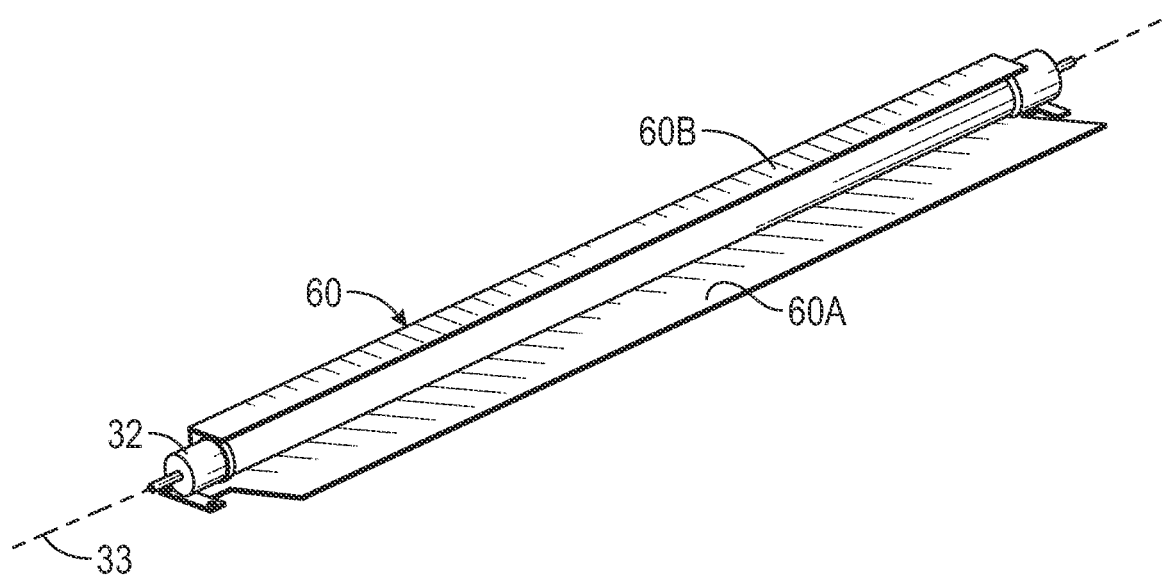
FIG. 5 is a perspective view of an infrared heater and reflective shroud of the machine.

Referring to FIG. 5, the infrared heater 32 of the present example has an elongated body 32D having a cylindrical shape. Infrared energy is emitted from each infrared heater circumferentially in all directions extending 360 degrees around a center axis 33 of the cylindrical body 32D of infrared heater 32. The infrared heater 32 has a reflective shroud 60 that is adapted to focus the infrared energy from the infrared heater 32 toward the additive printed part 30. The reflective shroud 60 has an elongated channel shape extending substantially the entire length of the body 32D infrared heater 32 and includes an inner reflective surface 60A and an outer surface 60B. At least the inner reflective surface 60A of the reflective shroud 60 is polished aluminum. Alternatively, the entire shroud 60 is made from polished aluminum.

Figure 6:
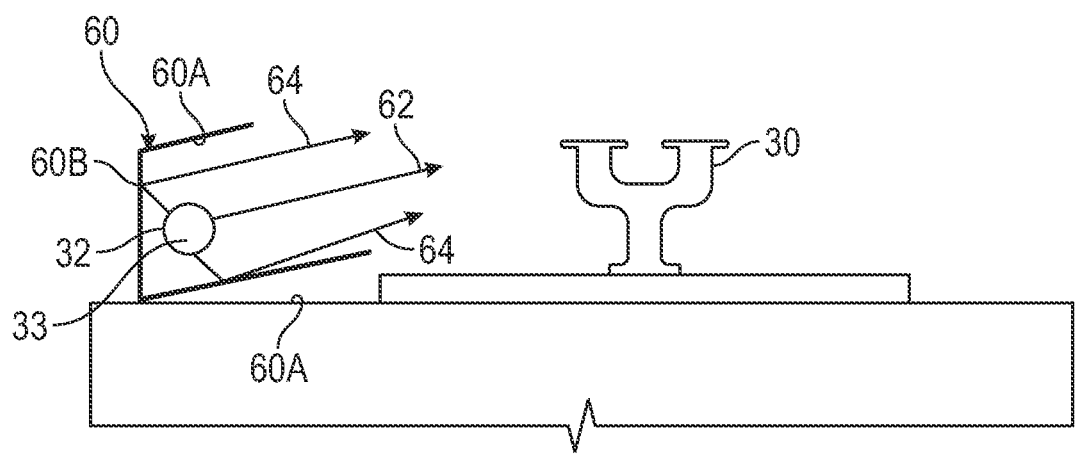
FIG. 6 is a side view of the build table and print bed with an additive printed part positioned on the print bed and an infrared heater positioned to one side of the print bed within the machine.

Waves of infrared energy are emitted circumferentially from the cylindrical body 32D infrared heater 32. Referring to FIG. 6, the inner reflective surface 60A of the shroud 60 deflects infrared energy and focuses the infrared energy toward the additive printed part 30. The shroud 60 is oriented such that infrared energy emitted directly toward the additive printed part 30 is not deflected and takes a direct path to the additive printed part, as shown at 62. Infrared energy emitted away from the additive printed part is deflected by the shroud and takes a deflected path toward the additive printed part, as shown at 64. The inner reflective surface 60A of the shroud 60 ensures that substantially all of the infrared energy emitted by the infrared heater 32 is directed toward the additive printed part 30.

One of the key advantages to using the infrared heater 32 to maintain a target temperature of the additive printed part 30 is that the infrared heater 32 provides more even and efficient heating of the printed part 30. Known machines heating of the printed part 30 by heating the print bed 24 or by convectively heating the ambient air within the machine. Heating the print bed 24 only heats the bottom layers of the printed part 30. Convective heat elements heat the ambient air within the machine, which is transferred to the printed part 30. A significant downside of this is that the printed part is heated from the outside in. To achieve a target temperature at the center of the part the outside of the printed part will be heated to a temperature exceeding the target temperature.

The infrared heaters 32A, 328, 32C of the present disclosure heat the additive printed part 30 from the inside out, without overheating the outer surface of the printed part 30. Using the infrared heaters 32A, 32B, 32C particularly in combination with traditional convective heating elements, allows the temperature of the printed part 30 to be controlled in different ways. For instance, the part 30 can be heated to a uniform temperature throughout, the outer surface of the part 30 can be heated while the inner portions of the part 30 are allowed to cool, or the outer surface of the part 30 can be allowed to cool while the inner portions of the part 30 are heated. The infrared heater 32 bombards the additive printed part 30 with infrared radiation that has a specific wavelength, ranging from 2 to 12 microns (Mid Wave Infra-Red Band).

The polymer material that the additive printed part 30 is made from absorbs the infrared energy and is heated by it. This is more efficient because the part is not being heated entirely from external convective energy. The printed part 30 is being heated by a combination of IR heaters which heat the part from the inside out, and convective heat sources which heat the ambient air and heat the part from the outside in. Further, to get the part to a target internal temperature, the ambient space within the build volume is heated to lower temperatures, therefore, the delicate instrumentation and components of the machine 10 itself are subjected to lower temperatures than they would be in a traditional convective-only system.

Figure 7:
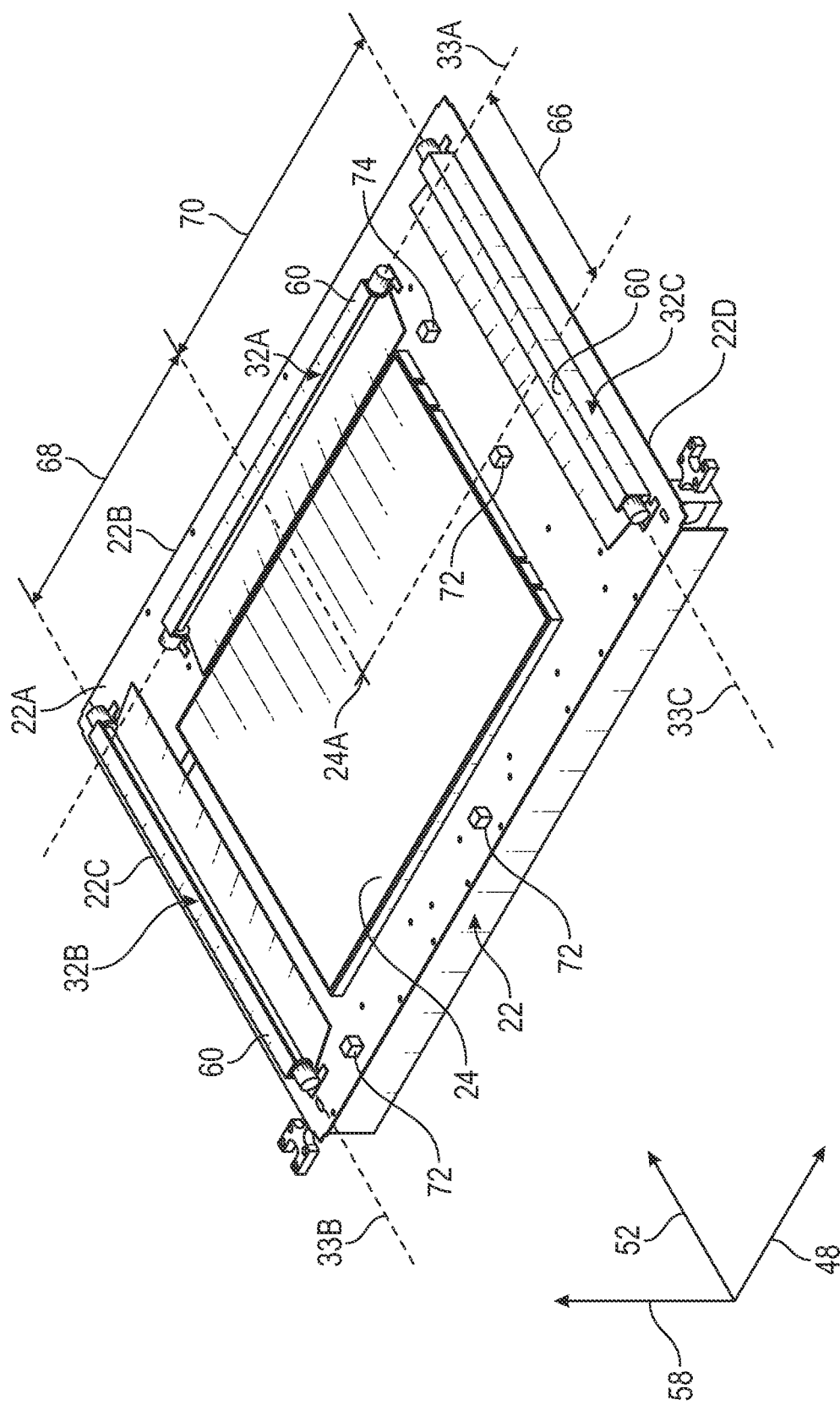
FIG. 7 is a perspective view of the print table, print bed and three infrared heaters of the machine.

A plurality of infrared heaters 32 can be used to provide added capability to the machine 10. Referring to FIG. 7, three infrared heaters 32A, 32B. 32C are mounted onto the build table 22 at various positions to allow each of the infrared heaters 32A, 32B, 32C to be positioned at a different distance from the additive printed part 30. The build table 22 is rectangular in shape, the first infrared heater 32A is mounted horizontally, adjacent and parallel to a first side 223 of the build table 22, the second infrared heater 32B is mounted horizontally, adjacent and parallel to a second side 22C of the build table 22, and a third infrared heater 32C is mounted horizontally, adjacent and parallel to a third side 22D of the build table 22. In one non-limiting example, at least one of the infrared heaters 32A, 32B, 32C is a multiplexed infrared light source. However, it is contemplated that other non-limiting examples of the infrared heaters can be non-multiplexed infrared light sources.

The print bed 24 is positioned on the top surface 22A of the build table 22 with the infrared heaters 32A, 32B, 32C positioned around it so the infrared energy emitted from the infrared heaters 32A, 32B, 32C is directed to the additive printed part 30 that is positioned on the print bed 24. The additive printed part 30 will be positioned at a center point 24A of the print bed 24. The shape of the print bed 24 is rectangular and is positioned on the build table 22 at a position that is shifted toward the second side 22C of the build table 22.

A center line 33A of the first infrared heater 32A is spaced from the center point 24A of the print bed 24 a first distance 66. A center line 33B of the second infrared heater 323 is spaced from the center point 24A of the print bed 24 a second distance 68. A center line 33C of the third infrared heater 32C is spaced from the center point 24A of the print bed 24 a third distance 70.

Each of the infrared heaters 32A, 323, 32C will emit infrared energy onto an additive printed part 30 that is located at the center point 24A of the print bed 24, but each of the infrared heaters 32A, 32B, 32C will be at a different position and at a different distance 66, 68, 70 from the center point 24A of the print bed 24. Because of this, each of the infrared heating elements 32A, 323, 32C will each provide a different intensity of infrared energy to the additive printed part 30.

The infrared heaters 32A, 323, 32C are controlled by simple on/off activation, and generally only one infrared heater 32A, 323, 32C is used at a time, however, the infrared heaters 32A, 32B, 32C are slow to start up and will keep giving off infrared energy after power is removed. These characteristics, in conjunction with having the infrared heaters 32A, 32B, 32C placed at different distances 66, 68, 70 from the center point 24A of the print bed 24 allow very specific heating profiles to be tailored as needed.

At least one black body sensor 72 is mounted within the build volume 28 to monitor the temperature of the additive printed part 30. The black body sensor 72 measures IR heat reflected by the additive printed part 30 specifically, rather than simply measuring the temperature of the ambient space surrounding the sensor 72. Use of multiple black body sensors 72 placed at various positions within the build volume 28 will allow the average temperature of the additive printed part 30 to be monitored thereby providing a more accurate average temperature of the additive printed part 30. As shown in FIG. 7, three black body sensors 72 are positioned at various locations on the top surface 22A of the build table 22. In addition to the black body sensors 72, the machine 10 also includes a traditional convective temperature sensor 74 mounted within the build volume 28 to monitor the temperature of the ambient space within the build volume 28. The use of black body sensors 72 to monitor the temperature of the printed part 30, along with conventional temperature sensors 74 to monitor the temperature of the ambient air within the build volume 28 allow precise temperature monitoring and control capability.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A machine for producing an additive printed part, the machine having a print head, wherein the print head is attached to a gantry, comprising:
   a frame having a plurality of side walls that define an interior space;
   a build table positioned within the interior space and including a print bed, the additive printed part being positioned on the print bed as the additive printed part is created;
   a plurality of bellows attached at a first end to the gantry and at a second end to at least one of the plurality of side walls;
   at least one window attached to at least one of the side walls;
   a build volume defined by the plurality of side walls, the plurality of bellows, the build table, and the at least one window;
   a first infrared heater disposed on the build table for heating the additive printed part being positioned on the print bed of the build table; and
   at least one sensor positioned within the build volume for measuring infrared (IR) heat reflected by the additive printed part,
   wherein each of the plurality of side walls, the plurality of bellows, and the at least one window includes a reflective surface oriented inward to the interior space.

2. The machine of claim 1, wherein the reflective surface of the plurality of side walls and the plurality of bellows is at least one of polished aluminum, polished stainless steel, and a first IR reflective coating.

3. The machine of claim 2, wherein the build table within the build volume is polished aluminum, and the reflective surface of the at least one window is a second IR reflective coating.

4. The machine of claim 3, wherein the first infrared heater produces infrared energy having a wavelength ranging from 2 to 12 microns.

5. The machine of claim 4, wherein the first infrared heater is mounted to the build table and oriented to emit infrared energy onto the additive printed part.

6. The machine of claim 5, further including a second infrared heater and a third infrared heater mounted to the build table, the first infrared heater emitting infrared energy onto the additive printed part from a first direction, the second infrared heater emitting infrared energy onto the additive printed part from a second direction, and the third infrared heater emitting infrared energy onto the additive printed part from a third direction.

7. The machine of claim 6, wherein the first, second and third infrared heaters are positioned in proximity to the print bed such that the first infrared heater is positioned a first distance from a center point of the print bed, the second infrared heater is positioned a second distance from the center point of the print bed, and the third infrared heater is positioned a third distance from the center point of the print bed.

8. The machine of claim 7, wherein each of the first, second, and third infrared heaters are elongated and cylindrical in shape, and wherein infrared energy is emitted from each of the first, second, and third infrared heaters in all directions extending 360 degrees around each of the first, second, and third infrared heaters.

9. The machine of claim 8, wherein the build table is rectangular in shape, the first infrared heater being mounted horizontally, adjacent and parallel to a first side of the build table, the second infrared heater being mounted horizontally, adjacent and parallel to a second side of the build table, and the third infrared heater being mounted horizontally, adjacent and parallel to a third side of the build table.

10. The machine of claim 9, wherein each of the first, second, and third infrared heaters further includes a reflective shroud adapted to focus the infrared energy from a corresponding one of the first, second, and third infrared heaters toward the additive printed part.

11. The machine of claim 10, wherein each reflective shroud has an elongated channel shape extending substantially an entire length of the corresponding one of the first, second and third infrared heaters and having an inner reflective surface and an outer surface, each reflective shroud being oriented such that infrared energy emitted directly toward the additive printed part does not hit the inner reflective surface and energy emitted away from the additive printed part hits the inner reflective surface of the reflective shroud and is reflected by the inner reflective surface of the reflective shroud toward the additive printed part.

12. The machine of claim 11, wherein the inner surface of each reflective shroud is made from polished aluminum.

13. The machine of claim 12, further including at least one black body sensor mounted within the build volume for monitoring a temperature of the additive printed part.

14. The machine of claim 13, further including at least one convective temperature sensor to monitor a temperature of ambient air within the build volume.

15. The machine of claim 14, wherein the at least one black body sensor includes a plurality of black body sensors mounted at various locations within the build volume for monitoring the temperature of the additive printed part.

16. A machine for producing an additive printed part, the machine having a print head, wherein the print head is attached to a gantry, comprising:
  a frame having a plurality of side walls, the plurality of side walls defining an interior space;
  a build table positioned within the interior space and including a print bed, the additive printed part being positioned at a center point on the print bed as the additive printed part is being created;
  a plurality of bellows attached at a first end to the gantry and at a second end to at least one of the plurality of side walls;
  at least one window attached to at least one of the side walls, wherein each of the plurality of side walls, the build table, the plurality of bellows, and the at least one window includes a reflective surface oriented inward to the interior space;
  a build volume defined by the reflective surface of the side walls, the reflective surface of the plurality of bellows, the reflective surface of the build table, and the reflective surface of the at least one window;
  a first infrared heater mounted horizontally, adjacent and parallel to a first side of the build table at a first distance from the center point of the print bed and oriented to emit infrared energy toward the center point of the print bed from a first direction, a second infrared heater mounted horizontally, adjacent and parallel to a second side of the build table at a second distance from the center point of the print bed and oriented to emit infrared energy toward the center point of the print bed from a second direction, and a third infrared heater mounted horizontally, adjacent and parallel to a third side of the build table at a third distance from the center point of the print bed and oriented to emit infrared energy toward the center point of the print bed from a third direction, wherein at least one of the first infrared heater, the second infrared heater, and the third infrared heater comprises a multiplexed infrared light source; and
  at least one sensor positioned within the build volume for measuring infrared (IR) heat reflected by the additive printed part.

17. The machine of claim 16, wherein the first infrared heater produces infrared energy having a wavelength ranging from 2 to 12 microns.

18. The machine of claim 17, wherein each of the first, second, and third infrared heaters are elongated and cylindrical in shape, wherein infrared energy is emitted from each of the first, second, and third infrared heaters in all directions extending 360 degrees around each of the first, second, and third infrared heaters.

19. The machine of claim 18, wherein each of the first, second, and third infrared heaters further includes a reflective shroud adapted to focus the infrared energy from the corresponding one of the first, second, and third infrared heaters toward the additive printed part.

20. The machine of claim 19, wherein each reflective shroud has an elongated channel shape extending substantially an entire length of the infrared heater and having an inner reflective surface and an outer surface, each reflective shroud being oriented such that infrared energy emitted directly toward the additive printed part is not deflected off of the inner reflective surface and energy emitted away from the additive printed part is reflected by the inner reflective surface of the reflective shroud back toward the additive printed part.

21. The machine of claim 20, wherein;
  the inner surface of each reflective shroud is made from polished aluminum;
  the reflective surface of at least one of the side walls, the bellows, and the build table is at least one of polished aluminum, polished stainless steel, and a first IR reflective coating; and
  the reflective surface of the at least one window is a second IR reflective coating.

22. The machine of claim 21, further including at least one black body sensor mounted within the build volume for monitoring a temperature of the additive printed part.

23. The machine of claim 22, further including at least one convective temperature sensor to monitor a temperature of ambient air within the build volume.

24. The machine of claim 23, wherein the at least one black body sensor includes a plurality of black body sensors mounted at various locations within the build volume for monitoring the temperature of the additive printed part.

* * * * *